(12) United States Patent
Vau

(10) Patent No.: US 10,591,876 B2
(45) Date of Patent: Mar. 17, 2020

(54) METHOD AND SYSTEM FOR ADAPTIVE COMPENSATION OF DRY FRICTION

(71) Applicant: IXBLUE, Saint-Germain-en-Laye (FR)

(72) Inventor: Bernard Vau, Saint Maur des Fosses (FR)

(73) Assignee: IXBLUE, Saint-Germain-en-Laye (FR)

( * ) Notice: Subject to any disclaimer, the term of this patent is extended or adjusted under 35 U.S.C. 154(b) by 334 days.

(21) Appl. No.: 15/526,489

(22) PCT Filed: Nov. 18, 2015

(86) PCT No.: PCT/FR2015/053116
§ 371 (c)(1),
(2) Date: May 12, 2017

(87) PCT Pub. No.: WO2016/079425
PCT Pub. Date: May 26, 2016

(65) Prior Publication Data
US 2017/0322523 A1    Nov. 9, 2017

(30) Foreign Application Priority Data
Nov. 18, 2014    (FR) .................................... 14 61133

(51) Int. Cl.
*G05B 13/04*    (2006.01)
*G05B 19/19*    (2006.01)
(Continued)

(52) U.S. Cl.
CPC ........... *G05B 13/042* (2013.01); *G05B 17/02* (2013.01); *G05B 19/19* (2013.01); *G05B 2219/41161* (2013.01); *G06F 17/14* (2013.01)

(58) Field of Classification Search
CPC .................... B25J 9/1664; F16H 3/721; G05B 2219/40466; G05B 2219/40514;
(Continued)

(56) References Cited

U.S. PATENT DOCUMENTS 8,622,864 B2 *  1/2014  Fauteux ................... B25J 9/102
                                                       475/91
8,719,212 B2 *  5/2014  Khoukhi ................ B25J 9/1623
                                                       700/36

OTHER PUBLICATIONS

Itthisek Nilkhamhang, et al., Adaptive friction compensation using the GMS model with polynomial stribeck function, 2006 IEEE International Conference on Control Applications, Oct. 4-6, 2006, pp. 1085-1090, Munich, DE.

* cited by examiner

*Primary Examiner* — Crystal J Barnes-Bullock
(74) *Attorney, Agent, or Firm* — Young & Thompson

(57) ABSTRACT

A dry friction compensation method for at least one mass or inertia M mobile under the effect of at least one effector element controlled by a force or torque control signal U, the motion of the mass or inertia being characterized by a motion signal Y chosen among one or several of the position X, the speed V and the acceleration, the method includes: defining an ideal model of the closed loop; defining a dry friction compensation control law; the dry friction compensation control law being based on the following friction model:

$$P = \min\left(\max\left(\frac{VM}{\tau} + U, -S\right), S\right),$$

where V is the speed of the mobile mass or inertial subjected to the friction and $\tau$ a minor time constant, and S is a parameter of dry friction.

17 Claims, 5 Drawing Sheets

(51) Int. Cl.
*G05B 17/02* (2006.01)
*G06F 17/14* (2006.01)

(58) Field of Classification Search
CPC ...... G05B 13/042; G05B 17/02; G05B 19/19; G05B 2219/41161; G06F 17/14
See application file for complete search history.

METHOD AND SYSTEM FOR ADAPTIVE COMPENSATION OF DRY FRICTION

The present invention relates to a method and a system for adaptive compensation of dry friction. It finds applications in the field of mechatronics and allows obtaining a better follow-up of setpoint instructions in mobile mechanical systems controlled by effector elements.

BACKGROUND OF THE INVENTION

In the field of control of mechanical systems, whether they are servomechanisms or robotized systems, the dry friction in said systems very often constitutes a source of difficulty for the engineer in charge of conceiving feedback control laws.

Indeed, this friction has an intrinsically non-linear behaviour (hard non-linearity), prejudicial to the quality of follow-up of a position, speed, acceleration, effort setpoint instruction, both for translational and rotational motions. This friction may also generate limit cycles (oscillatory phenomena of the position of a mechanical system controlled by a constant setpoint instruction) or produce a "stick and slip" phenomenon, commonly called "grabbing", causing the mechanical system to move jerkily.

The explication of the origin of such friction pertains to the tribology field. It results from the accumulation of a very high number of phenomena occurring at the microscopic or even atomic scale. Unfortunately, the microscopic approach is not very useful for the automation expert, due to the complexity of the physical phenomena involved that make its exploitation inconceivable for the building of control laws.

In a feedback control loop, the dry friction is hence commonly modelled by a disturbing force (or torque), whose sign is in first approximation opposed to the speed thereof: it is talked about Coulomb friction. To that is added a so-called Stribeck effect: after immobilization, the actuator must overcome a force (torque) called "Stiction" force/torque, whose module is higher than that required to maintain the motion, one the latter is effective.

In the field of automation, the dry friction compensation technics exist since the beginning of the 1940's. One of the first methods intended to attenuate the grabbing phenomenon consisted in additively introducing into the actuator control signal a sinusoidal signal of relatively high frequency with respect to the bandwidth of the feedback control. This technic is called "dither".

Since the 60's have progressively appeared macroscopic models intended to describe this friction from the phenomenological point of view, with the mathematical tool. These more or less complicated models, describing more or less finely the behaviour of mechanical systems, are called Tustin, Karnopp, Dahl, Slimane-Sorine, LuGre models . . . . The elaboration of such macro-models is still today a subject of research.

In parallel with the development of the friction models, compensation control laws based on said models have progressively appeared, consisting in particular in estimating and compensating the friction torque in real time as a function of the measured speed of the mechanical system: an application of this approach has been made in particular based on the LuGre model by H. Olson, K. J. Aström et al. in the article: "Friction models and friction compensation", European journal of control, 1998.

To be effective, such friction compensation control laws must be based on accurately parameterized models. Now, the characteristics of the friction of the mechanical system are liable to evolve over time, as a function for example of the temperature, of the lubrication of the parts in contact, of the wear, etc. . . . .

The above-described models have in common to depend only on the speed of the mobile mechanical system. Some of them, too basic, are not simulatable as such (as for example the Coulomb model), and cause high-frequency switches leading to the freezing of the simulation tool. Other ones describe the friction phenomenon far finely, as for example the LuGre model, but the number of parameters constituting it is relatively high (6 parameters for the LuGre model) and the identification of these parameters is a task that may be long to implement, especially in an industrial context in which, in particular, the respect of the time limits is an important criterion.

In 2009, a new dry friction model has been published by Philippe de Larminat in the book "Automatique appliquée, $2^{nde}$ édition", Hermès edition. This model, contrary to the preceding ones, has been elaborated starting from the observation that the friction effort is function not only of the speed but also of the force (or torque) delivered by the actuator. This model is, as emphasized by the author, one of the simplest models that has never been developed. It describes the Coulombian effect as well as the Stribeck effect. Moreover, this model has the advantage to have a restricted number of parameters: two parameters for the Coulombian effect and a third one for the Stribeck effect.

Associated with this model, a compensation control law has been proposed in the same book, which also has a simplicity that is very interesting for an implementation in real time in an industrial framework. This control law takes only into account the mass or the inertia of the controlled mobile mechanical system, a minor time constant and a variable representative of the Coulomb module. Nevertheless, to be efficient, this compensation control law presupposes a precise knowledge of the Coulomb module of the friction. Failing that, the control law "overcompensate" or "undercompensate" for the friction and the beneficial effects on the feedback controls of the mechanical system are very reduced. Hence, this dry friction compensation control law, efficient as it is, really risks to have an ephemeral efficiency, because it will become inoperative when the physical parameters of the friction will have evolved over time.

Hence, it is herein proposed to add an adaptive structure to the compensation control law presented in the above-mentioned book of Ph. de Larminat and that is what the present invention proposes.

It is known in this field an article by M. Itthise Nilkhamhang, "Adaptive Friction Compensation using the GMS Model with Polynomial Stribeck function", which proposes to linearize a GMS model.

SUMMARY OF THE INVENTION

In the following, the mass is mentioned for the mobile controlled mechanical system, but it is to be understood in the context of the invention as being actually a mass or an inertia according to the case. Likewise, a force is mentioned for the motion control signal, but it is to be understood in the context of the invention as being actually a force or a torque according to the case. Likewise, the position, the speed and the acceleration may be of linear or angular types according to the case. Indeed, the motion can be linear and/or angular, and more generally be any motion.

Hence, the invention relates to a dry friction compensation method for a mechanical system of an apparatus including at least one mass or inertia M mobile under the effect of at least one effector element controlled by a force or torque control signal U, the mass or inertia having to move according to the instructions of a setpoint signal $C_r$ chosen among one or several of the position (linear or angular according to the case) $X_r$, the speed (linear or angular according to the case) $V_r$ and the acceleration (linear or angular according to the case), the motion of the mechanical system being characterized by a motion signal Y chosen among one or several of the position X, the speed V and the acceleration (linear or angular according to the case), in which:

an ideal model of the closed loop is defined, receiving as an input the setpoint signal Cr and producing as an output an ideal motion signal Ym relating to the motion of the mass or inertia according to an ideal model of the mechanical system, a dry friction compensation control law is defined, receiving as an input the setpoint signal Cr and producing as an output the control signal U for the effector element putting the mass or inertia in motion and whose motion is measured by at least one motion measuring sensor, said sensor producing a motion measurement signal Y, the dry friction compensation control law being adaptive as a function of a parameter of dry friction value S, said dry friction compensation control law being based on the following friction model:

$$P = \min\left(\max\left(\frac{VM}{\tau} + U, -S\right), S\right),$$

where V is the speed of the mobile mass or inertial subjected to the friction and T is a minor time constant, the ideal motion signal Ym and the motion measurement signal Y are compared with each other to produce an error signal $\varepsilon(t)$, an estimation $\hat{S}$ of the dry friction S is calculated as a function of the error signal $\varepsilon(t)$, said estimation $\hat{S}$ is used as a parameter of dry friction value in the dry friction compensation control law in order to correct the control signal as a function of the estimation $\hat{S}$ of the dry friction value.

In various embodiments of the invention, the following means, which can be used alone or according to any technically possible combination, are used:

the speed V is either measured directly, or estimated and in particular by an observer, the control signal U is a force control signal or a torque control signal, the control signal U is transformed into an electric signal adapted to the control of the electric effector, the control signal U is transformed into a pneumatic signal adapted to the control of the pneumatic effector, the control signal U is transformed into a hydraulic signal adapted to the control of the hydraulic effector, the motion measurement signal Y is chosen among the position X, the speed V, or even the acceleration, the motion measurement sensor is chosen among one or several of: a position sensor, a speed sensor (linear or angular), the position sensor is in particular a linear or angular encoder, the speed sensor is in particular a tachometer, the effector element is a motor, in particular a direct current motor or a brushless motor, the effector element is a hydraulic or pneumatic actuator, the ideal model of the closed loop is the model of the controlled mechanical system, with the supposition that there is no dry friction, the model of the ideal controlled mechanical system is known a priori, in particular due to the fact that it is simple and that it corresponds to a determinable combination of simple elementary models allowing the calculation thereof, the model of the ideal controlled mechanical system is determined from measurements performed on the real mechanical system, in particular by stimulation of said mechanical system, by performing, for example, an offline identification procedure, the ideal model of the closed loop corresponds to the transfer between $Y_r(t)$ and $Y(t)$, i.e.:

$$Y_m(t) = \frac{G(s) \cdot T(s)}{1 + G(s) \cdot F(s)} \cdot Y_r(t)$$

with:

$$T(s) = M \cdot (s^2 + K_{c2} \cdot s + K_{c1})$$
$$F(s) = M \cdot (K_{c2} \cdot s + K_{c1})$$
$$G(s) = \frac{1}{M \cdot s^2}$$

the dry frictions are coulombian frictions, the setpoint signal Cr is chosen among one or several of the following signals: position Xr, speed Vr, the ideal motion signal Ym and the motion measurement signal Y are chosen among signals of the type: position Ym X or speed Vm V, respectively, the estimation $\hat{S}$ of the dry friction value is calculated from:

$\dot{\hat{S}} = \lambda \cdot \Phi(t) \cdot \varepsilon(t)$ (which is the derivative of the estimation)

with:

$\lambda$ a strictly positive scalar corresponding to the adaptation gain of the adaptive compensation control law, $\lambda = \text{sgn}(\gamma_r(t) \cdot \tau + V(t))$ where $V(t)$ is a speed motion measurement signal, $\tau$ is a minor time constant and $\gamma_r$ is an acceleration piloting signal, a state-feedback control law is implemented and the acceleration piloting signal is calculated by $\gamma_r = U_r + K_{c1}(Y_r - Y) + K_{c2}(V_r - V)$ with $Y_r$, V, setpoint signals, X, V motion measurement signals, and $K_{C1}$ and $K_{C2}$ state-feedback gains, V possibly resulting from an estimation (in particular by an observer), the estimation $\hat{S}$ of the dry friction value is calculated from:

$\dot{\hat{S}} = \lambda \cdot \Phi_f(t) \cdot \varepsilon(t)$ (which is the derivative of the estimation)

with:

$\lambda$ a strictly positive scalar that is the adaptation gain of the adaptive compensation control law, $$\Phi_f(t) = \frac{G(s)}{1 + G(s) \cdot F(s)} \cdot \phi(t)$$

where F(s) is the transfer function of the "feedback" part of the corrector, G(s) is the input-output transfer function of the system to be piloted, and in the case of a state-feedback position control with force or torque control:

$$F(s) = M \cdot (K_{c2} \cdot s + K_{c1})$$

$$G(s) = \frac{1}{M \cdot s^2}$$

$$\phi(t) = sgn(\gamma_r(t) \cdot \tau + V(t))$$

where V(t) is a speed motion measurement signal, $\tau$ is a minor time constant and $\gamma_r$ an acceleration piloting signal, in the case of a state-feedback control law, the acceleration piloting signal is calculated by $\gamma_r = U_r + K_{c1}(Y_r - Y) + K_{c2}(V_r - V)$ with Xr, $V_r$ setpoint signals, X, V motion measurement signals and $K_{C1}$ and $K_{C2}$ state-feedback gains, V being possibly estimated by ($\hat{V}$), the motion measurement signals are measured by sensors on the mobile mass or inertia, the motion measurement signals come from sensors, in particular position sensor—encoder—or speed sensor—tachometer, in the motion measurement signals, the position X is a position measured by a sensor, a position-feedback control is implemented, in the motion measurement signals, the position X is chosen among:
  a position of the mass or inertia measured by a sensor,
  a position of the mass or inertia calculated from a measurement of a motion signal other than the position of the mass or inertia, a speed-feedback control is implemented, in the motion measurement signals, the speed V is chosen among:
  a speed of the mass or inertia measured by a sensor,
  a speed of the mass or inertia calculated from a measurement of a motion signal other than the speed of the mass or inertia and in particular the position of the mass or inertia by derivative calculation,
  a speed $\hat{V}$ of the mass or inertia estimated by calculation, in particular by means of a state observer, an acceleration-feedback control is implemented, in the motion measurement signals, the acceleration is chosen among:
  an acceleration of the mass or inertia measured by a sensor,
  an acceleration of the mass or inertia calculated from a measurement of a motion signal other than the acceleration of the mass or inertia,
  an acceleration of the mass or inertia estimated by calculation, in particular by means of a state observer, the adaptation gain $\lambda$ is variable, the adaptive dry friction compensation control law includes a corrector of the state-feedback type, the adaptive dry friction compensation control law includes a PI corrector, of proportional-integral actions, the adaptive dry friction compensation control law includes a PID corrector, of proportional-integral-derivative functions, a PID corrector, of proportional-integral-derivative functions, is implemented, and the proportional and derivative functions of the PID corrector are added to produce the acceleration piloting signal $\gamma_r$, at least the output of the integral function of the PID corrector is available as a proper signal usable in the adaptive dry friction compensation control law, a PID corrector, of proportional-integral-derivative functions, is implemented, and the PID corrector produces by combination of the proportional-integral-derivative functions an intermediate control signal $U_{PID}$ and said intermediate control signal $U_{PID}$ is used in the adaptive dry friction compensation control law to produce $\gamma_r$ after passage through a high-pass filter, an RST or LQG, $H_\infty$ corrector is implemented, a calculator and at least one sensor producing the mass or inertia motion measurement signal are implemented, and real time calculations according to the adaptive dry friction compensation control law are performed to produce the control signal U, the method is implemented in an existing mechanical system including a PID corrector and the PID corrector is used with the adaptive dry friction compensation control law, the existing PID corrector produces the intermediate control signal $U_{PID}$.

The invention also relates to a device for implementing the method of the invention and that includes a calculator and at least one motion measurement sensor producing a mass or inertia motion measurement signal and, further, means for real time calculation in the calculator and according to the adaptive dry friction compensation control law to produce the control signal U.

The invention also relates to an apparatus including:
  a mechanical system including at least one mass or inertia M mobile under the effect of at least one actuator element controlled by a control signal U, the mass or inertia having to move according to the instructions of a setpoint signal $C_r$ chosen among one or several of the position Xr, the speed $V_r$ and the acceleration, at least one motion sensor measuring the motion of the mass or inertia, producing a motion measurement signal chosen among one or several of the position X, the speed V and the acceleration,
  a calculator, and
  at least one sensor of mass motion signal, the calculator including means for adaptive compensation calculation according to the adaptive dry friction compensation control law implemented in the method according to the invention.

BRIEF DESCRIPTION OF THE DRAWINGS

The present invention, without being limited thereby, will now be exemplified by the following description of embodiments and implementation modes in relation with.

DETAILED DESCRIPTION OF THE PREFERRED EMBODIMENTS

The detailed description of the invention will first begin by a presentation of the model of Ph. de Larminat before passing to an exemplary embodiment of the invention in which the compensation control law is made adaptive for the model in question.

The model presented hereinafter is that of a mass or inertia subjected to a force by an actuator, for example a mobile element operated by an electrical motor and in contact with a wall, this contact causing dry frictions.

It is a particularly simple model, which can concern both translational and rotational motions.

Let's consider the following types of data:
M: Mass or inertia of the mobile mechanical system,
S: Coulombian friction module
U: Driving force corresponding to a effort/force or torque control, not to be mixed up with $U_r$ (acceleration setpoint) that will be introduced later,
P: Disturbing force or torque due to the dry friction,
V: Speed of the system measured by a sensor,
X: Position of the system measured by a sensor,
According to the fundamental relation of the dynamics, we have:

$$\dot{V} = \frac{1}{M}(U - P) \qquad (1)$$

where $\dot{v}$ is an acceleration.

The friction model proposed by Ph. de Larminat is the following:

$$P = \min\left(\max\left(\frac{VM}{\tau} + U, -S\right), S\right) \qquad (2)$$

where V is the speed of the mobile mass or inertia subjected to the friction.

In equation (2), $\tau$ is a minor time constant, for example of a few milliseconds.

By combining (1) and (2), we obtain:

$$\dot{V} = \frac{1}{M}\left(U - \min\left(\max\left(\frac{VM}{\tau} + U, -S\right), S\right)\right) \qquad (3)$$

Figure 1:
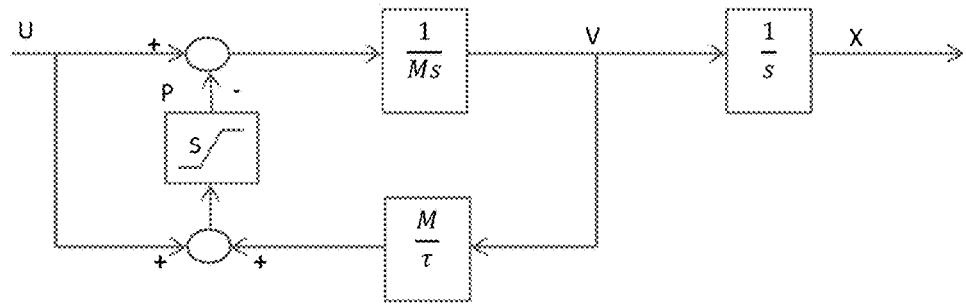
FIG. 1, which is a block diagram of the dry friction model used within the framework of the present invention, FIG. 2, which shows the dry friction compensation control law such as proposed by Ph. de Larminat, FIG. 3, which shows a schematic diagram of the adaptive dry friction compensation control law of the invention, FIG. 4, which shows as a functional block diagram a first adaptive dry friction compensation control law based on a first calculated estimation Ŝ of the Coulombian friction module S, for a position-feedback control, FIG. 5, which shows as a functional block diagram a second adaptive dry friction compensation control law based on a second calculated estimation Ŝ of the Coulombian friction module S, for a position-feedback control, FIG. 6, which shows as a functional block diagram a third adaptive dry friction compensation control law based on a PID corrector and on the second calculated estimation Ŝ of the Coulombian friction module S, for a position-feedback control, FIG. 7, which shows as a functional block diagram a fourth adaptive dry friction compensation control law based on a PID corrector and on the second calculated estimation Ŝ of the Coulombian friction module S, for a position- and speed-feedback control, with an estimation for this latter, FIG. 8, which shows as a functional block diagram a fifth adaptive dry friction compensation control law for a speed-feedback control and based on the first calculated estimation Ŝ of the Coulombian friction module S, FIG. 9, which shows as a functional block diagram a sixth adaptive dry friction compensation control law for a speed-feedback control and based on the second calculated estimation Ŝ of the Coulombian friction module S, and FIG. 10, which shows as a functional block diagram a seventh adaptive dry friction compensation control law for a speed-feedback control and based on a PID corrector and on the second calculated estimation Ŝ of the Coulombian friction module S.

The block diagram corresponding to the model (3) of Ph. de Larminat is shown in FIG. 1.

To this raw model may be added various elements, for example a load disturbance C or also various feedbacks depending on X and/or V (return forces, viscous friction, non linearities . . . ) noted W, so that the equation becomes:

$$\dot{v} = \frac{1}{M}(U - P - C - W) \qquad (4)$$

Moreover, a more complete model has been developed by the same author for taking into account the Stribeck effect.

The dry friction compensation law developed in the same book, which is not adaptive, is based on a state-feedback control of the type:

$$U = M \cdot (U_r + K_{c1}(X_r - X) + K_{c2}(V_r - V)) \qquad (5)$$

where
$X_r$: Position setpoint by a reference coming from a trajectory generator, for this position control law,
$V_r$: Speed setpoint by a reference coming from a trajectory generator,
$U_r$: Acceleration setpoint by a reference coming from a trajectory generator,
$K_{C1}$ and $K_{C2}$ are state-feedback gains,
X: a position signal of the mass or inertia subjected to friction,
V: a speed signal of the mass or inertia subjected to friction.
The speed and position signals of the mass or inertia that are motion measurement signals may come from sensors or be calculated: the speed V that is a motion measurement signal can be estimated from X if no speed sensor provides this information.

To the "raw" state-feedback control law of equation (5), it is possible to add a compensation for the load disturbances C and other feedbacks W so that we have:

$$U = M \cdot (U_r + K_{c1}(X_r - X) + K_{c2}(V_r - V)) + C + W(Y_r, V) \qquad (6)$$

The friction compensation in the above-mentioned book is made by adding in equation (6) a term:

$$S \cdot sgn(V + \gamma_r \cdot \tau) \qquad (7)$$

with:

$$\gamma_r = U_r + K_{c1}(X_r - X) + K_{c2}(V_r - V) \qquad (8)$$

sgn( ) being the function sign.
Finally, the friction compensation law proposed by Ph. de Larminat is written:

$$U = M \gamma_r + C + W(Y_r, V) + S \cdot sgn(V + \gamma_r \cdot \tau) \qquad (9)$$

Figure 2:
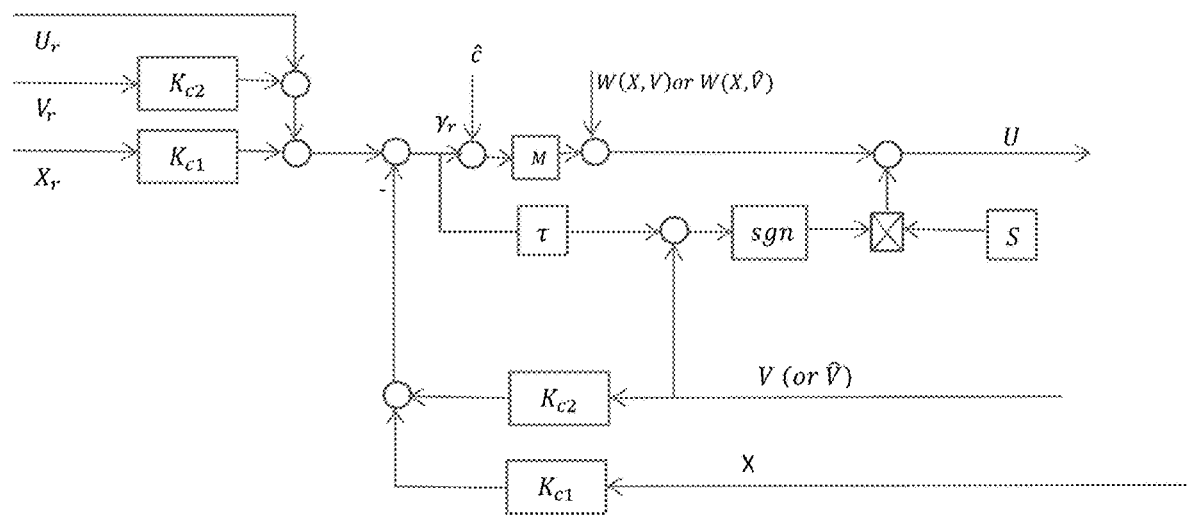

The block diagram corresponding to this friction compensation law (9) of Ph. de Larminat is shown in FIG. 2.

The friction compensation law in equation (9) has the drawback not to be adaptive and it has therefore a limited industrial interest, because the variations of the friction parameters are significant over the life of a product.

We will now explain the method of the invention that allows, by making the compensation law (9) adaptive, obtaining a better operation of the machines including controlled mobile parts undergoing friction. The invention hence allows obtaining an adaptive friction compensation control law based on a non-adaptive dry friction compensation law (9) such as that of Ph. de Larminat.

This adaptive compensation control law estimates S (Coulombian friction Module) in real time, the estimate being denoted g, so as to inject this parameter into the compensation law.

If the control law (5) is applied to the system described by equation (1), with the hypothesis P=0, a perfect follow-up of the setpoint instruction $Y_r$ by Y is obtained, i.e.:

$$Y(t)=Y_r(t) \forall t \quad (10)$$

In the presence of dry friction, i.e. $\varepsilon(t) \neq 0$, equation (10) is no longer verified, if there is not the compensation device described by equations (7) and (9).

Let's define the variation in the setpoint $\varepsilon(t)$ between the output of an ideal model of the closed loop $Y_m(t)$ and the output of the real closed loop $Y(t)$ (including the system subjected to the dry frictions), subjected to the same setpoint $Y_r(t)$:

$$\varepsilon(t)=Y_r(t)-Y(t) \quad (11)$$

The adaptive control law that we propose to develop has for objective to minimize a criterion relating to $\varepsilon(t)$. For example, the minimization may relate:
- $\varepsilon^2(t)$ at each instant of time,
- $\int \varepsilon^2(t)dt$.

Other minimization criteria based on $\varepsilon(t)$ may also be used.

More generally, $\varepsilon(t)$ may be defined as a calculated variation between an output $Y_m$ of an ideal model of the desired closed loop and an output—also called feedback signal/signals —, in particular by measurement, Y of the mobile mechanical system, both subjected to the setpoint $Y_r$, i.e.:

$$\varepsilon(t)=Y_m-Y \quad (12)$$

Equation (11) corresponds to a particular case in which the ideal model of the closed loop corresponds to a unit gain.

It is to be understood that the variation may be calculated between any kind of outputs of the same type of the ideal model and of the mechanical system, and not only of the position X type. Hence, the variation may be calculated by difference between outputs of the speed type.

The adaptive law consists, from $\varepsilon(t)$, in determining $\hat{S}$, estimate of the Coulomb module S and in injecting this estimate into equation (9).

Figure 3:
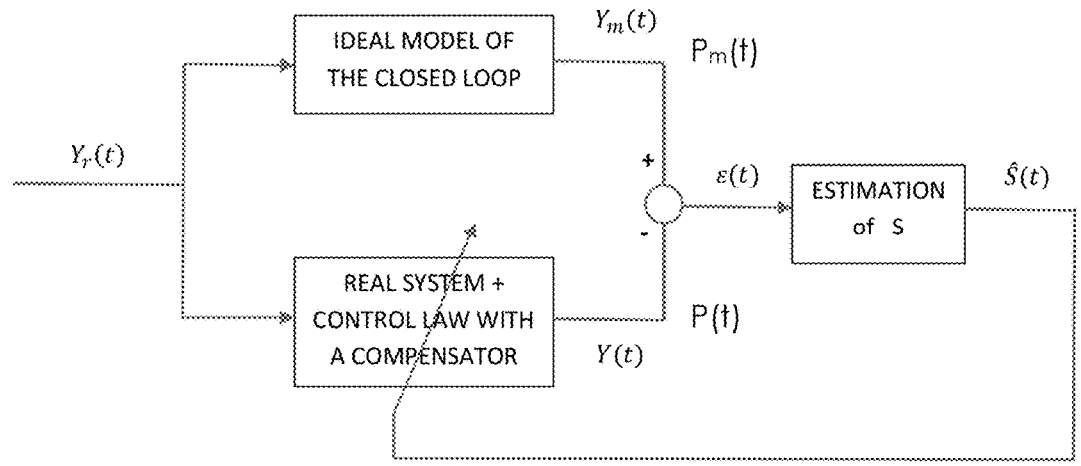

The schematic representation of the principle of the adaptive dry friction compensation control law is given in FIG. 3.

The non-adaptive control law according to equation (9) proposed by Ph. de Larminat provides a perfect compensation for the friction model of equation (3), provided that the estimate $\hat{S}(t)$ of $S(t)$ is exact. In this case, we have simply:

$$\dot{V}=\gamma_r \quad (13)$$

Generally, the estimation of S is not perfect, and the estimate variation is defined:

$$\tilde{S}=\hat{S}-S \quad (14)$$

From the moment that the estimation $\hat{S}(t)$ of $S(t)$ is imperfect, it is obtained by combining equations (9), (3) and (14):

$$M \cdot \dot{V} = \gamma_r(S+\tilde{S}) \cdot \text{sgn}(\gamma_r \cdot \tau + V) - \min\left(\max\left(U+\frac{M}{\tau}, -S\right), S\right) \quad (15)$$

But, as $S \cdot \text{sgn}(\gamma_r \tau+V)$ compensates for $$\min\left(\max\left(U+\frac{M}{\tau}, -S\right), S\right),$$

it is deduced therefrom:

$$M \cdot \dot{V}=\gamma_r+\tilde{S} \cdot \text{sgn}(\gamma_r \cdot \tau+V) \quad (16)$$

The second term of the right part of equation (16) may be considered as an additive disturbance at the input of the system acting in the closed loop.

Let's call d this "additive disturbance":

$$d(t)=\tilde{S} \cdot \text{sgn}(\gamma_r \cdot \tau+V) \quad (17)$$

Moreover, when only the linear part of the control law, i.e. equation (6), is considered, it can be seen that this law can be decomposed into an anticipating action or "feedforward" part T(s) and a retroaction or "feedback" part F(s), a law that can be expressed by means of the Laplace variable s and having for variables setpoint and measurement inputs Y(t) and $Y_r(t)$, respectively. In particular, this law may include an observer of the load disturbance.

Hence, in the most general way, the control U(t) may be expressed as:

$$U(t)=T(s) \cdot Y_r(t)-F(s) \cdot Y(t) \quad (18)$$

If considering the control law of equation (9) restricted to its linear components, and also with omitting the term of load disturbance C, we have:

$$T(s)=M \cdot (s^2+K_{c2} \cdot s+K_{c1})$$

$$F(s)=M \cdot (K_{c2} \cdot s+K_{c1})$$

And the transfer between U(t) and Y(t) may also be modelled by a very simple transfer function, by a double integrator, G(s):

$$Y(t)=G(s) \cdot U(t) = \frac{1}{M \cdot s^2} \cdot U(t) \quad (19)$$

The transfer function between the "additive disturbance" d(t) and the closed-loop output Y(t) is written:

$$Y(t) = \frac{G(s)}{1+G(s) \cdot F(s)} d(t) + \frac{G(s) \cdot T(s)}{1+G(s) \cdot F(s)} \cdot Y_r(t) \quad (20)$$

The transfer function of the ideal model of the closed loop (see equation 12), corresponds by definition to the transfer between $Y_r(t)$ and Y(t):

$$Y_m(t) = \frac{G(s) \cdot T(s)}{1+G(s) \cdot F(s)} \cdot Y_r(t) \quad (21)$$

In this case, the error between the output of the ideal model $Y_m(t)$ and the closed-loop output of the system Y(t), by combination of equations 12, 20, 21, is written:

$$\varepsilon(t) = -\frac{G(s)}{1 + G(s) \cdot F(s)} d(t) \quad (22)$$

d(t) being expressed according to the expression (17).

In this equation (17), it is noted that d(t) is affine in S.

This leads in proposing as a law of estimation of S, the following law:

$$\hat{S} = \lambda \cdot \Phi(t) \cdot \varepsilon(t) \quad (23)$$

with:

λ a strictly positive scalar, which is by definition the gain of adaptation,

φ=sgn($\gamma_r$(t)·τ+V(t)) if the speed V(t) is measured, otherwise an estimate $\hat{V}$(t) of V(t) is used instead of V(t), and which is calculated for example by means of a state observer.

The application of equation (23) of estimation of S to the adaptive dry friction compensation control law of FIG. 3 applied to the dry friction compensation model of Ph. De Larminat of equation (9)/FIG. 2 gives the adaptive compensation law represented as blocks in FIG. 4 and which is of the state-feedback type.

Figure 4:
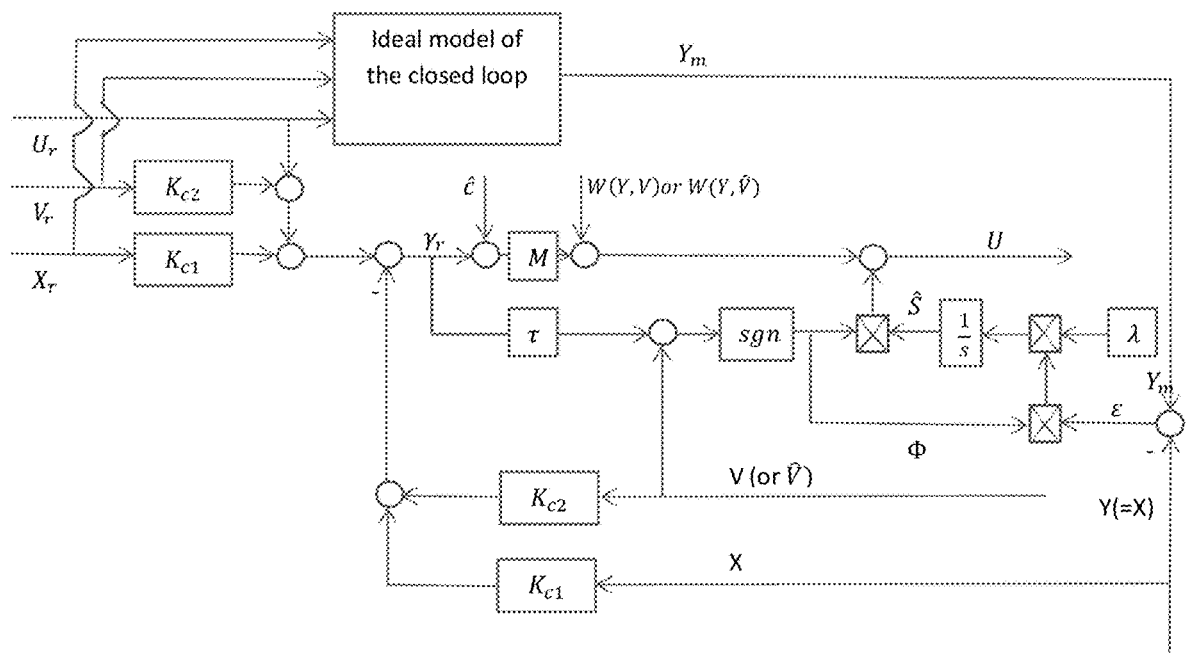

In the left part of FIG. 4, we find setpoint input signals, herein $U_r$, $V_r$, Xr. Towards the right of this same Figure, we find other measurement signals obtained from the measurements on the mobile mechanical system or that are calculated with herein the measured speed V or the estimation thereof and the measured position X. At the output, we find the control signal U intended to control at least one motor/effector moving a mass or inertia subjected to friction, wherein the mass or inertia can comprise mobile elements of the motor/effector.

On the top of FIG. 4, we find the block corresponding to the ideal model of the closed loop that corresponds to the transfer function given at equation (21) hereinabove. This ideal model receives as an input the setpoint input signals $U_r$, $V_r$, Xr. This ideal model produces as an output an ideal motion signal relating to the motion of the mass or inertia according to the ideal model (supposed without friction) of the system and that is herein of the position type: $Y_m$.

Towards the bottom of FIG. 4, we find the blocks of calculation and compensation according to the dry friction compensation model of Ph. de Larminat to produce the control signal U. We find blocks corresponding to the calculations of equation (9) with, on the side of the setpoint instructions and measurements, blocks $K_{C1}$ and $K_{C2}$, which are the state-feedback gains already mentioned. We find blocks corresponding to the mass or inertia M of the mobile element in motion and to the minor time constant τ. We finally find the specific blocks of calculation of the estimation $\hat{S}$ calculated according to a first calculation mode presented above and using directly φ(t) (a second calculation mode $\hat{S}$ will be seen in relation with FIG. 5).

The study of the convergence of the law (23) may be made using the passivity theory. It is shown in particular that a sufficient condition of convergence is that the transfer function $$\frac{G(s)}{1 + G(s)F(s)}$$

is positive real, that is to say that the Nyquist locus of said transfer function must be integrally comprised in the right half-plane of the complex plane.

This convergence condition is potentially penalizing, so we have interest in releasing it by substituting $\phi_f$(t) to φ(t) in the following equation (24):

$$\Phi_f(t) = \frac{G(s)}{1 + G(s) \cdot F(s)} \cdot \phi(t) \quad (24)$$

The law of estimation of S is then written:

$$\hat{S} = \lambda \cdot \phi_f(t) \cdot \varepsilon(t) \quad (25)$$

The application of equation (25) of estimation of S to the adaptive dry friction compensation control law of FIG. 3 applied to the dry friction compensation model of Ph. De Larminat of equation (9)/FIG. 2 gives the adaptive compensation law represented as blocks in FIG. 5.

Figure 5:
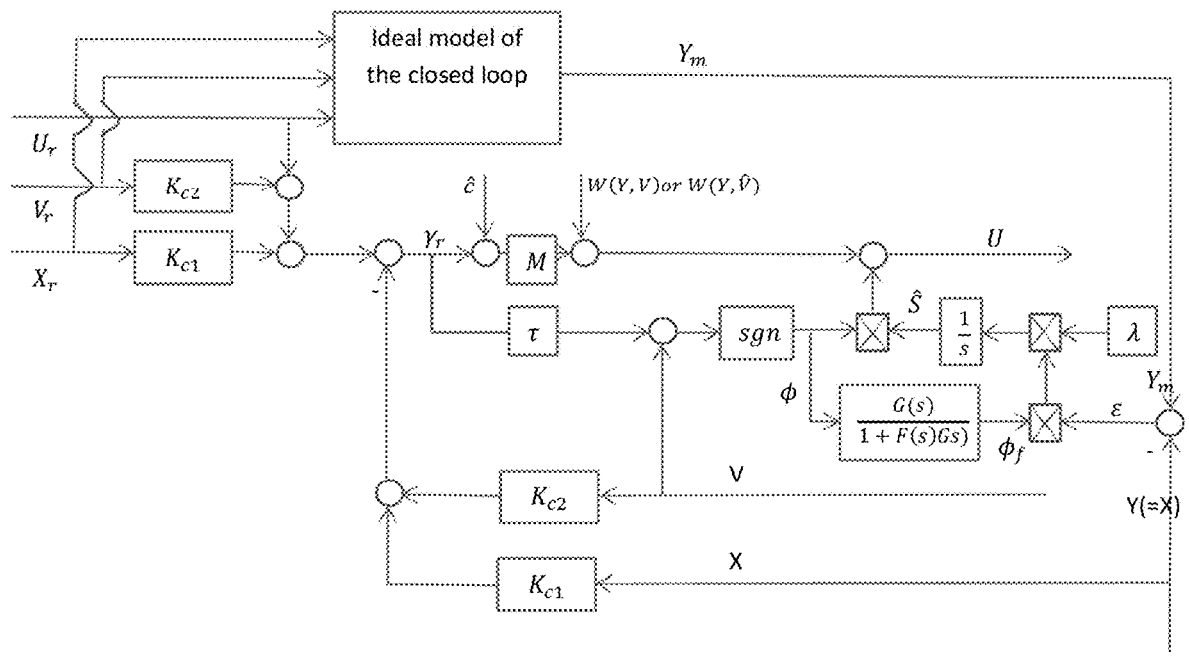

The adaptive dry friction compensation control law represented as blocks in FIG. 5 corresponds to the representation of FIG. 4, except for what concerns the specific blocks of calculation of the estimation $\hat{S}$ that is herein calculated according to a second mode of calculation, where $\phi_f$(t) has been substituted to φ(t).

Calculation algorithms may be implemented, in particular in real time, based on the adaptive dry friction compensation control laws shown in FIGS. 4 and 5.

It can be shown that the algorithms based on these FIGS. 4 and 5, and hence on the respective equations (23) and (25), tend to minimize $\varepsilon^2$(t) at each instant and is likenable to the gradient algorithm.

It is possible to complexify the preceding adaptive compensation control laws by making the adaptation gain λ variable, in order to minimize for example the sum of squares of ε(t), or the sum of squares of ε(t) weighted by a forgetting factor.

In this latter case, the adaptation gain may, for example, be expressed according to equation (26):

$$\dot{\lambda}(t) = -(1-\mu) \cdot F^{-1}(t) + \Phi^2(t) \quad (26)$$

Or equation (27):

$$\dot{\lambda}(t) = -(1-\mu) \cdot F^{-1}(t) + \phi_f^2(t) \quad (27)$$

In equations (26) and (27), the coefficient μ is the forgetting factor mentioned hereinabove, with: 0<μ<1.

In the feedback control field, the PID ("proportional-integral-derivative) correctors are by far the most commonly used. Therefore, it is desirable to be able to have an adaptive friction compensation control law of this type. A law of the type will now be described, still on the friction model of Ph. de Larminat.

The control signal of a PID corrector may be expressed as follows:

$$U_{PID}(t) = \left(K_p + \frac{K_i}{s} + \frac{K_d \cdot s}{\sigma \cdot s + 1}\right) \cdot (Y_r - Y) \quad (28)$$

with:

$K_p$: proportional coefficient,
$K_i$: integral coefficient,
$K_d$: derivative coefficient,
σ: filtering time constant of the derivative action.

It is to be noted that this representation is not unique, and that there exists a great number of possibilities of implementation of a PID, in particular parallel, series, series-parallel, nevertheless a compensation law based on the structure (28) will be described hereinafter without this description be limitative, because any implementation of a PID corrector may be substituted to (28).

If referring to the scheme of FIG. 2 to transpose a PID corrector thereto, it may be considered that the signal $\gamma_r$ associated with the friction corrector is simply the signal U(t) of equation (28), from which has been subtracted the integral action of the PID corrector. Indeed, the integral action is that which has for role to compensate for the static disturbances. Now, the hypothesis has been made of a static load disturbance C(t), which means that the main role of the integral action is to compensate for the load disturbance.

In these conditions, $\gamma_r(t)$ is written:

$$\gamma_r(t) = \left(K_p + \frac{K_d \cdot s}{\sigma \cdot s + 1}\right) \cdot (Y_r - Y) \quad (29)$$

Figure 6:
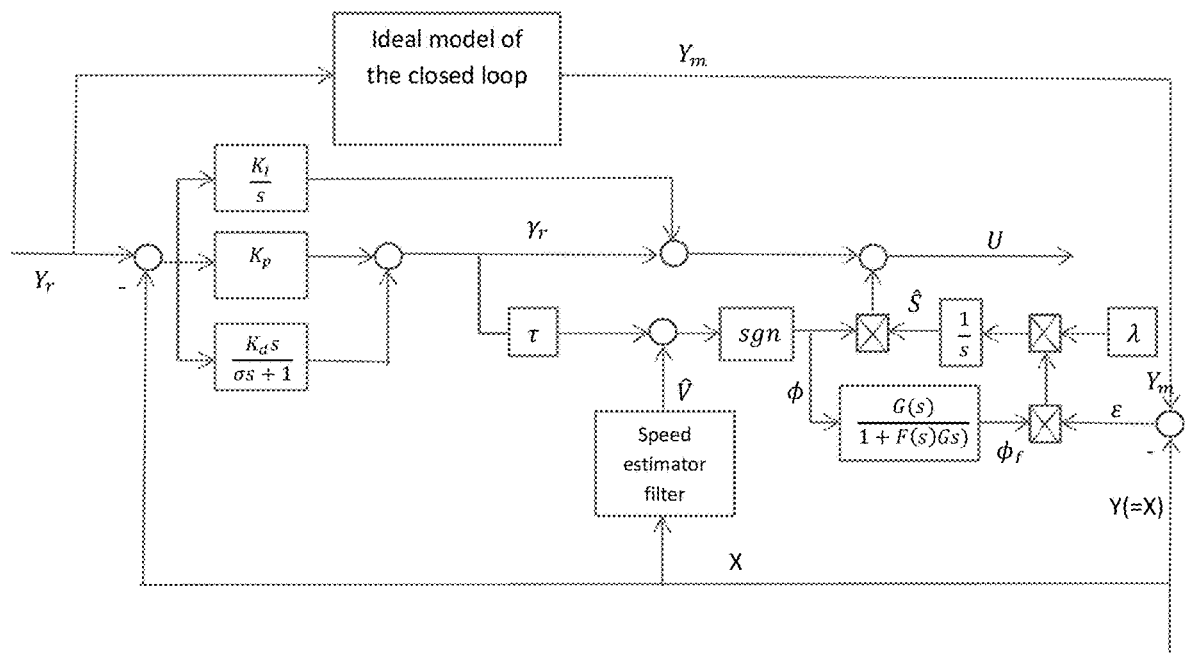

Hence, the adaptive dry friction compensation control structure is deduced immediately and the PID adaptive friction compensation control law represented as blocks in FIG. 6 is obtained.

In order to obtain an estimation of the speed $\hat{V}$ from information of position X obtained by a position sensor, a speed estimator filter is implemented in the obtained control law.

Incidentally, in other implementations, the speed estimator filter may be a high-pass filter or a state observer, and may further have as additional input the control signal U.

It can be noted that the control law of this FIG. 6 uses, similarly to that of FIG. 5, the application of equation (25) of estimation of S to the control low, which introduces a block $$\frac{G(s)}{1 + G(s)F(s)}$$

in the law. It is well understood that, in an alternative embodiment, this block $$\frac{G(s)}{1 + G(s)F(s)}$$

can be omitted to obtain a control law that is likened to that of FIG. 4, but in the context of a PID corrector and, in this case, the right part of FIG. 6 uses the block structure of the right part of FIG. 4.

In this PID control law structure, it is also possible to add anticipating action or "feedforward" blocks to the position, speed and/or acceleration setpoint(s), to form the signal $\gamma_r$.

As indicated hereinabove, there exists a great number of PID corrector forms. Whatever said form is, the signal $\gamma_r$ corresponds to the control part with no load disturbance compensation.

Incidentally, it may be noted by comparison with equation (18) that, in the case of the PID control law implemented as (28), we also have:

$$F(s) = \left(K_p + \frac{K_i}{s} + \frac{K_d \cdot s}{\sigma \cdot s + 1}\right),$$

where F(s) is the above-mentioned retroaction or "feedback" part.

In some cases, it is not possible to have access to the internal signals of the PID corrector, in particular when the PID is a product of the market included in a specific electronic casing, so that it may be necessary to calculate the signal $\gamma_r$ from the position control signal produced by the PID corrector in its entirety: $U_{PID}(t)$. By combining (28) and (29), we find the relation:

$$\frac{\gamma_r}{U_{PID}} = \frac{(K_p\sigma + K_d) \cdot s^2 + s}{(K_p\sigma + K_d) \cdot s^2 + (K_I\sigma + K_p) \cdot s + K_I} \quad (30)$$

The transfer function of equation (30) is that of a high-pass filter whose gain is 1 when $s \to \infty$.

More generally, the signal $\gamma_r$ may be calculated from the position control signal $U_{PID}$ by a high-pass filtering that does not necessarily obey to that of equation (30). Here also, the PID corrector may be implemented under various forms with or without anticipating actions ("feedforward") blocks.

Figure 7:
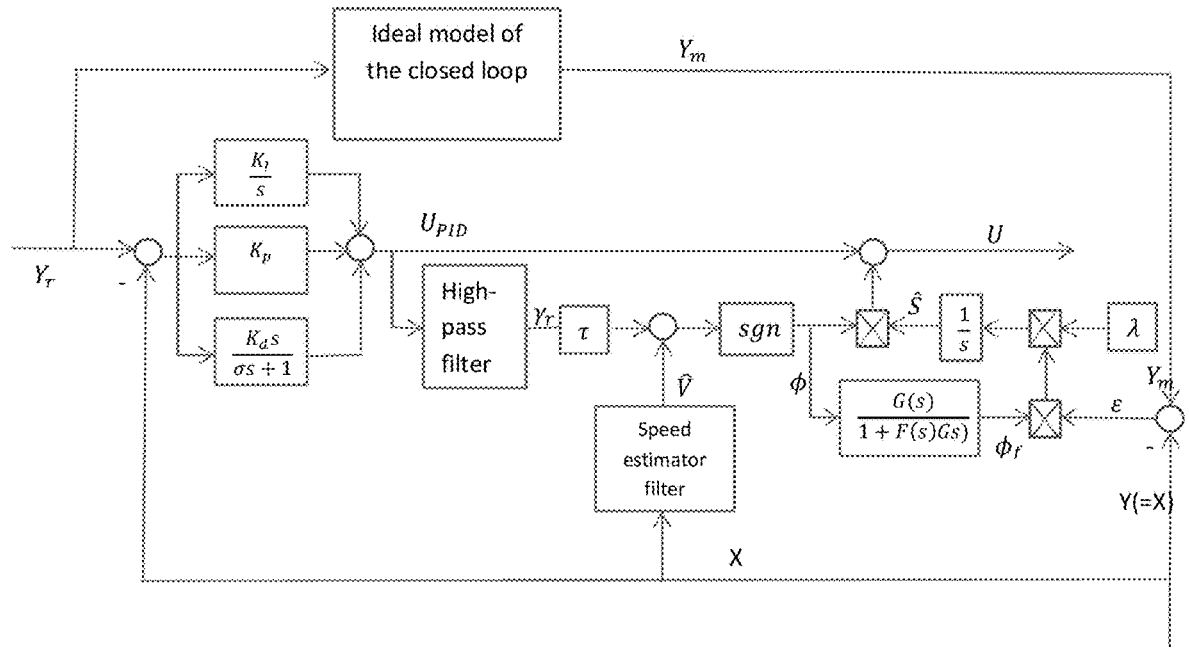

By way of example, it has been shown in FIG. 7, as a block diagram, a PID adaptive friction compensation control law in which the signal $\gamma_r$ is calculated by a high-pass filter form the position control signal $U_{PID}$ produced by the PID corrector. As hereinabove, in an alternative embodiment, the block $$\frac{G(s)}{1 + G(s)F(s)}$$

may be omitted.

The shown adaptive control laws may also be implemented with a speed feedback.

In a speed-feedback structure, i.e. in which the signal to be processed by the closed loop, is the speed V(t), la structure of the adaptive friction compensation control laws described in relation with FIGS. 4, 5, 6 and 7 do not change fundamentally.

Indeed, the transfer function G(s) of equation (19) is then simply written:

$$G(s) = \frac{1}{M \cdot s} \quad (31)$$

The transfer function F(s) is then also simplified.

The setpoint signal $Y_r$ disappears, as well as the measurement signal Y. Remain the setpoint signals $V_r$ and possibly $U_r$. The feedback signal measured is herein V. Moreover, the output of the ideal model of the closed loop is a speed signal $V_m$ and the signal $\varepsilon(t)$ is calculated by making the difference between V $V_m$. Finally, an estimator of V becomes useless due to the fact that this feedback value is necessarily measured.

Figure 8:
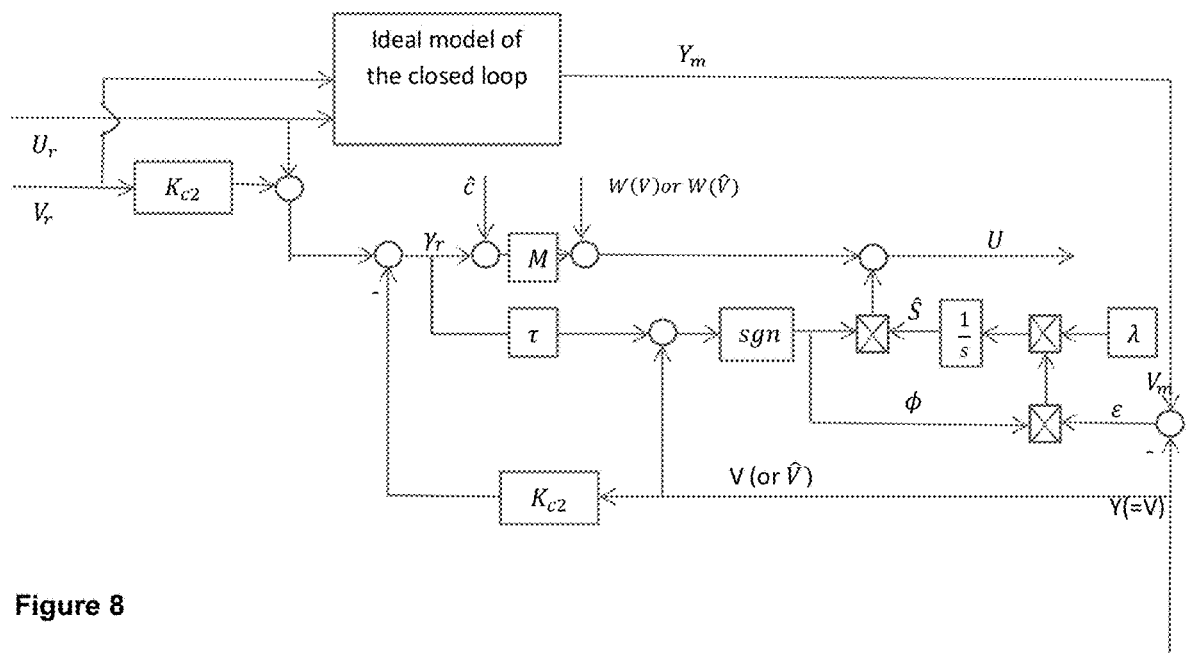
Figure 9:
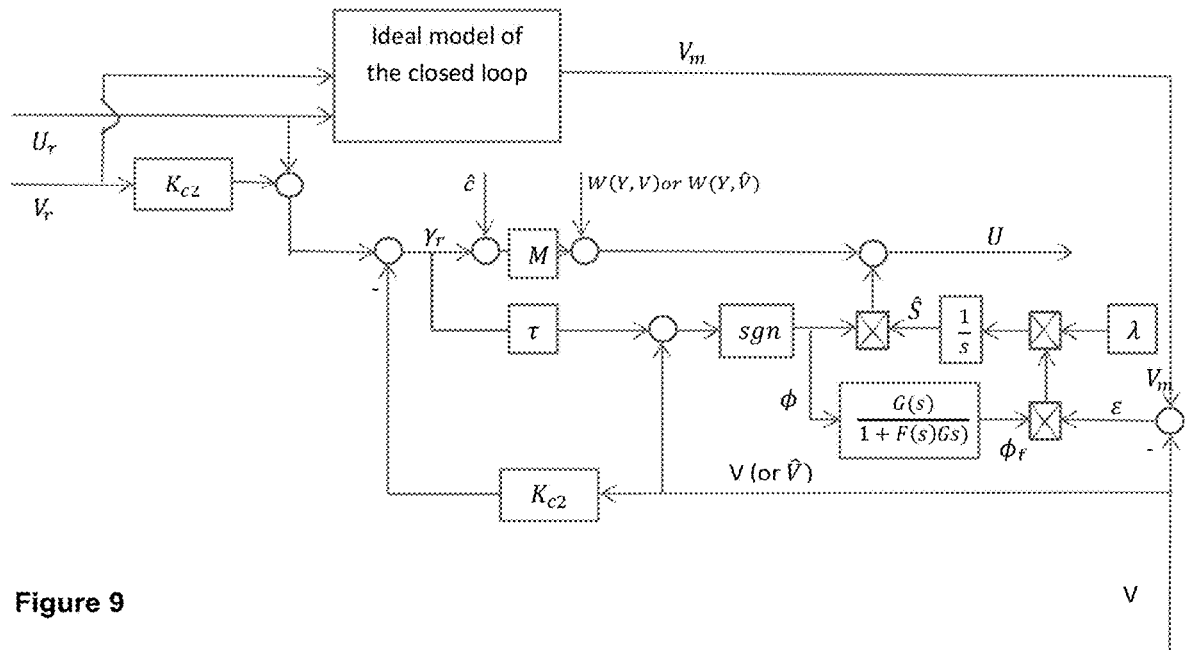
Figure 10:
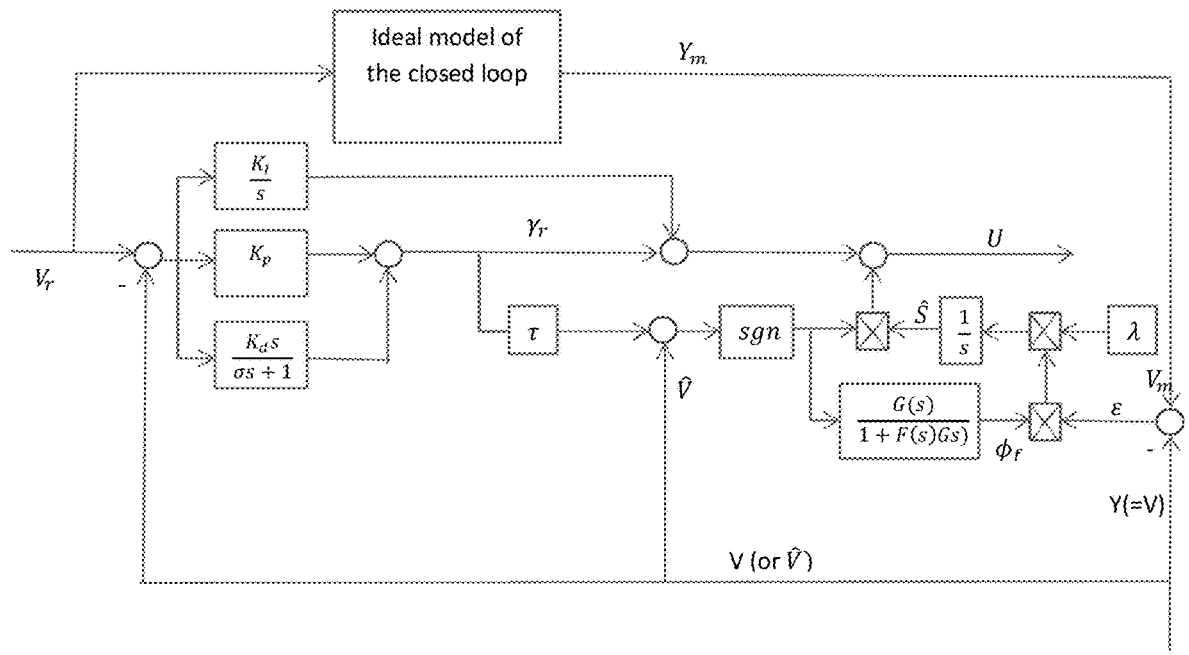

Hence, the control law schematized in FIG. 4 applied to a context of speed-feedback control becomes the control law schematized in FIG. 8. Similarly, the control law schematized in FIG. 5 applied to a context of speed-feedback control becomes the control law schematized in FIG. 9. Finally, for the PID laws, the control low schematized in FIG. 6 applied to a context of speed-feedback control becomes the control law schematized in FIG. 10. As indicated hereinabove, this structure of FIG. 10 for a PID-feedback control may be modified, in particular by omission of the derivative action and/or by addition of anticipating action ("feedforward") blocks.

The adaptive friction compensation control law that has been presented up to now has been so for a base corrector of the state-feedback type, and, in an alternative embodiment, with a PID corrector. In other embodiments, it is possible to use this compensation law with other correction structures, for example RST, LQG, $H_\infty$. In any case, it is necessary to calculate the signal $\gamma_r$ that corresponds to the control with no load disturbance.

It may also be contemplated to extend this compensation law to an acceleration-feedback control, provided however that information about the speed of the system is known. Indeed, if the system has only one acceleration sensor and no speed sensor, said speed is not "observable" within the meaning defined by Kalman.

The invention claimed is:

1. A dry friction compensation method for a mechanical system of an apparatus that includes a mass or inertia M that is mobile under effect of an effector element controlled by a force or torque control signal U, the mass or inertia M having to move according to instructions of a setpoint signal $C_r$ chosen among at least one of a position $X_r$, a speed $V_r$, and an acceleration, a motion of the mass or inertia being characterized by a motion measurement signal Y chosen among at least one of the position X, the speed V, and the acceleration, the method comprising:

defining an ideal model of a closed loop, by receiving as an input the setpoint signal $C_r$, and producing as an output an ideal motion signal Ym relating to the motion of the mass or inertia according to an ideal model of the mechanical system; and defining a dry friction compensation control law, by receiving as an input the setpoint signal $C_r$ and producing as an output the control signal U for the effector element that puts the mass or inertia in motion and whose motion is measured by a motion measurement sensor, said sensor producing a motion measurement signal Y, the dry friction compensation control law being adaptive as a function of a parameter of a dry friction value S, said dry friction compensation control law being based on the following friction model:

$$P = \min\left(\max\left(\frac{VM}{\tau} + U, -S\right), S\right),$$

where V is the speed of the mobile mass or inertia subjected to the friction and $\tau$ a minor time constant;

comparing the ideal motion signal Ym and the motion measurement signal Y with each other to produce an error signal s(t);

calculating the estimation $\hat{S}$ of the dry friction S as a function of the error signal s(t); and using said estimation $\hat{S}$ as a parameter of dry friction value in the dry friction compensation control law in order to correct the control signal as a function of the estimation $\hat{S}$ of the dry friction value.

2. The method according to claim 1, wherein the estimation $\hat{S}$ of the dry friction value is calculated from:

$$\dot{\hat{S}} = \lambda \cdot \Phi_f(t) \cdot \varepsilon(t)$$

with:

$\lambda$ being a strictly positive scalar corresponding to the adaptation gain of the adaptive compensation control law, and $$\phi(t) = sgn(\gamma_r(t) \cdot \tau + V(t))$$

where V(t) is a speed motion measurement signal, $\tau$ is a minor time constant, and $\gamma_r$ is an acceleration piloting signal.

3. The method according to claim 2, wherein the adaptation gain $\lambda$ is variable.

4. The method according to claim 2, wherein a state-feedback control law is implemented and the acceleration piloting signal is calculated by $$\gamma_r = U_r + K_{C1}(Y_r - Y) + K_{C2}(V_r - V)$$

with $X_r$, $V_r$ being setpoint signals, X, V being motion measurement signals, and $K_{C1}$ and $K_{C2}$ being state-feedback gains.

5. The method according to claim 2,
wherein a PID corrector, of proportional-integral-derivative functions, is implemented, and
wherein the proportional-integral-derivative functions of the PID are added to produce the acceleration control signal $\gamma_r$.

6. The method according to claim 2,
wherein a PID corrector, of proportional-integral-derivative functions, is implemented, and
wherein the PID produces, by combination of the proportional-integral-derivative functions, an intermediate control signal $U_{PID}$,
said intermediate control signal $U_{PID}$ used in the adaptive dry friction compensation control law to produce the acceleration control signal $\gamma_r$ after passage through a high-pass filter.

7. The method according to claim 2, wherein an RST or LQG, $H_\infty$ corrector is implemented.

8. The method according to claim 1,
wherein a speed-feedback control is implemented, and
wherein, in the motion measurement signals, the speed is chosen among:
a speed of the mass or inertia measured by a sensor,
a speed of the mass or inertia calculated from the position of the mass or inertia by derivative calculation, and
a speed $\hat{V}$ of the mass or inertia by estimated calculation by means of a state observer.

9. The method according to claim 1,
wherein a position-feedback control is implemented, and
wherein, in the motion measurement signals, the position X is chosen among:
a position of the mass or inertia measured by a sensor, and
a position of the mass or inertia calculated from a measurement of a motion signal other than the position of the mass or inertia.

10. The method according to claim 1, wherein the estimation $\hat{S}$ of the dry friction value is calculated from:

$$\dot{\hat{S}} = \lambda \cdot \Phi(t) \cdot \varepsilon(t),$$

with:

$\lambda$ being a strictly positive scalar corresponding to the adaptation gain of the adaptive compensation control law, and $$\Phi_f(t) = \frac{G(s)}{1+G(s)\cdot F(s)} \cdot \phi(t)$$

where
F(s) is the transfer function of the "feedback" part of the corrector,
G(s) is the input-output transfer function of the system to be piloted, and
in the case of a state-feedback position control with force or torque control:

$$F(s)=M\cdot(K_{c2}\cdot s+K_{c1})$$

$$G(s) = \frac{1}{M\cdot s^3}$$

$$\Phi(t)=sgn(\gamma_r(t)\cdot\tau+V(t))$$

where V(t) is a speed motion measurement signal, τ is a minor time constant, and $\gamma_r$ is an acceleration piloting signal.

11. The method according to claim 10, wherein the adaptation gain λ is variable.

12. The method according to claim 10, wherein a state-feedback control law is implemented and the acceleration piloting signal is calculated by $$\gamma_r=U_r+K_{c1}(X_r-Y)+K_{c2}(V_r-V)$$

with $X_r$, $V_r$ being setpoint signals, X, V being motion measurement signals, and $K_{C1}$ and $K_{C2}$ being state-feedback gains.

13. The method according to claim 10,
wherein a PID corrector, of proportional-integral-derivative functions, is implemented, and
wherein the proportional-integral-derivative functions of the PID are added to produce the acceleration control signal $\gamma_r$.

14. The method according to claim 10,
wherein a PID corrector, of proportional-integral-derivative functions, is implemented, and
wherein the PID produces, by combination of the proportional-integral-derivative functions, an intermediate control signal $U_{PID}$,
said intermediate control signal $U_{PID}$ used in the adaptive dry friction compensation control law to produce the acceleration control signal $\gamma_r$ after passage through a high-pass filter.

15. The method according to claim 10, wherein an RST or LQG, $H_\infty$ corrector is implemented.

16. A device, comprising:
a calculator;
a motion measurement sensor configured to produce a mass or inertia motion measurement signal Y corresponding to a motion of a mass or inertia M that is mobile under effect of an effector element and moving according to instructions of a setpoint signal $C_r$ chosen among at least one of a position $X_r$, a speed $V_r$, and an acceleration, said motion measurement signal Y corresponding to at least one of the position X, the speed V, and the acceleration of the mass or inertia; and
means for real time calculation in the calculator according to an adaptive dry friction compensation control law to produce a control signal U for the effector element,
the calculator and means for real time calculation being configured to define the dry friction compensation control law by receiving the setpoint signal $C_r$ as input and producing as an output the control signal U for the effector element that puts the mass or inertia in motion and whose motion is measured by the motion measurement sensor to produce the motion measurement signal Y, the dry friction compensation control law being adaptive as a function of a parameter of dry friction value S,
said dry friction compensation control law being based on the following friction model:

$$P = \min\left(\max\left(\frac{VM}{\tau} + U, -S\right), S\right),$$

where V is the speed of the mobile mass or inertia subjected to the friction and τ a minor time constant,
the calculator and means for real time calculation configured to:
compare an ideal motion signal Ym and the motion measurement signal Y with each other to produce an error signal s(t), the ideal motion signal Ym relating to the motion of the mass or inertia according to an ideal model of a closed loop of the mechanical system based on the setpoint signal $C_r$ as input,
calculate the estimation Ŝ of the dry friction S as a function of the error signal s(t), and
use said estimation Ŝ as a parameter of dry friction value in the dry friction compensation control law in order to correct the control signal as a function of the estimation Ŝ of the dry friction value.

17. An apparatus, comprising:
a mechanical system including at least one mass or inertia M that is mobile under the effect of an effector element controlled by a control signal U, the mass or inertia having to move according to the instructions of a setpoint signal $C_r$ chosen among at least one of a position $X_r$, a speed $V_r$, and an acceleration;
a motion measurement sensor that measures a motion of the mass or inertia and produces a motion measurement signal Y corresponding to at least one of the position X, the speed V and the acceleration of the mass or inertia; and
a calculator, including means for adaptive compensation calculation according to an adaptive dry friction compensation control law to produce the control signal U,
the calculator and means for adaptive compensation calculation configured to define the dry friction compensation control law by receiving the setpoint signal $C_r$ as input and producing as an output the control signal U for the effector element that puts the mass or inertia in motion and whose motion is measured by the motion measurement sensor to produce the motion measurement signal Y, the dry friction compensation control law being adaptive as a function of a parameter of dry friction value S,
said dry friction compensation control law being based on the following friction model:

$$P = \min\left(\max\left(\frac{VM}{\tau} + U, -S\right), S\right),$$

where V is the speed of the mobile mass or inertia subjected to the friction and τ a minor time constant, the calculator and means for adaptive compensation calculation configured to:

compare an ideal motion signal Ym and the motion measurement signal Y with each other to produce an error signal s(t), the ideal motion signal Ym relating to the motion of the mass or inertia according to an ideal model of a closed loop of the mechanical system based on the setpoint signal $C_r$ as input, calculate the estimation $\hat{S}$ of the dry friction S as a function of the error signal s(t), and use said estimation $\hat{S}$ as a parameter of dry friction value in the dry friction compensation control law in order to correct the control signal as a function of the estimation $\hat{S}$ of the dry friction value.

\* \* \* \* \*